United States Patent
Mitchell et al.

(10) Patent No.: US 11,283,790 B2
(45) Date of Patent: Mar. 22, 2022

(54) AGENTLESS IDENTITY-BASED NETWORK SWITCHING

(71) Applicant: IP Technology Labs, LLC, Olney, MD (US)

(72) Inventors: Gary Mitchell, Owings Mills, MD (US); Scott Whittle, Olney, MD (US); Kurt Quasebarth, Baltimore, MD (US)

(73) Assignee: IP Technology Labs, LLC, Olney, MD (US)

( * ) Notice: Subject to any disclaimer, the term of this patent is extended or adjusted under 35 U.S.C. 154(b) by 142 days.

(21) Appl. No.: 16/904,650

(22) Filed: Jun. 18, 2020

(65) Prior Publication Data

US 2020/0403987 A1    Dec. 24, 2020

Related U.S. Application Data

(60) Provisional application No. 62/863,587, filed on Jun. 19, 2019.

(51) Int. Cl.
*H04L 29/06* (2006.01)
*H04L 9/32* (2006.01)

(52) U.S. Cl.
CPC ........ *H04L 63/0823* (2013.01); *H04L 9/3263* (2013.01); *H04L 63/10* (2013.01); *H04L 63/18* (2013.01)

(58) Field of Classification Search
CPC ..... H04L 63/0823; H04L 63/10; H04L 63/18; H04L 9/3263
See application file for complete search history.

(56) References Cited

U.S. PATENT DOCUMENTS

| | | | |
|---|---|---|---|
| 10,419,931 B1 * | 9/2019 | Sohail | H04L 63/0823 |
| 2008/0209213 A1 * | 8/2008 | Astrand | H04L 63/18 |
| | | | 713/168 |

(Continued)

OTHER PUBLICATIONS

M Prakash et al., An Analysis of Types of Protocol Implemented in Internet of Things Based on Packet Loss Ratio, Mar. 2016, ACM, pp. 1-6. (Year: 2016).*

(Continued)

*Primary Examiner* — Luu T Pham
*Assistant Examiner* — Fahimeh Mohammadi
(74) *Attorney, Agent, or Firm* — Offit Kurman, P.A.; Steven Scott Lloyd

(57) ABSTRACT

The invention described herein is that of systems and methods for agentless identity-based authentication of network-enabled devices for control of network traffic to and from each device based on identity. The invention leverages X.509 certificates associated with network devices and comprises at least one querying device in communication with at least target device and optionally at least one intermediate device, such as but not limited to a switching device that can interface with the target device and enable the querying device to query the target device to obtain an X.509 certificate and any extensions, then dictate switching actions, which may be carried out by the querying device according to instructions provided by a switching module residing on the querying device or located external to the querying device. The systems and methods described herein are suitable for validation of the identities of fixed application devices to prevent unauthorized network access.

16 Claims, 5 Drawing Sheets

(56) References Cited

U.S. PATENT DOCUMENTS

| | | | |
|---|---|---|---|
| 2009/0031410 A1* | 1/2009 | Schneider | H04L 63/0823 726/10 |
| 2009/0126001 A1* | 5/2009 | Krantz | H04L 63/0884 726/10 |
| 2013/0110936 A1* | 5/2013 | Miura | H04L 63/0876 709/204 |
| 2014/0057599 A1* | 2/2014 | Hazari | H04W 12/06 455/411 |
| 2014/0261414 A1* | 9/2014 | Weitzel | A61M 15/0051 128/203.14 |
| 2015/0229475 A1* | 8/2015 | Benoit | H04L 63/061 713/168 |
| 2018/0176218 A1* | 6/2018 | Moreno | H04L 63/20 |
| 2018/0176771 A1* | 6/2018 | Yang | H04L 9/0819 |
| 2019/0132931 A1* | 5/2019 | Sharma | H04W 12/06 |
| 2019/0289042 A1* | 9/2019 | Perreault | H04L 67/104 |
| 2020/0174993 A1* | 6/2020 | Wood | H04L 41/0866 |

OTHER PUBLICATIONS

Sye Loong Keoh et al., Securing the Internet of Things: A Standardization Perspective, May 16, 2014, IEEE, vol. 1, Issue: 3, pp. 265-275. (Year: 2014).*

Marc-Oliver Pahl et al., Securing IoT Microservices with Certificates, Jul. 9, 2018, IEEE, pp. 1-5. (Year: 2018).*

Shahid Raza et al., S3K: Scalable Security With Symmetric Keys—DTLS Key Establishment for the Internet of Things, Jan. 6, 2016, IEEE, vol. 13, Issue: 3, pp. 1270-1280. (Year: 2016).*

* cited by examiner

AGENTLESS IDENTITY-BASED NETWORK SWITCHING

CROSS REFERENCE TO RELATED APPLICATIONS

This application claims the benefit of priority of U.S. Provisional Pat. App. No. 62/863,587, filed Jun. 19, 2019, the contents of which are hereby incorporated into this application by reference in their entirety.

STATEMENT REGARDING FEDERALLY SPONSORED RESEARCH OR DEVELOPMENT

The invention described in this application was made without federal funding.

BACKGROUND OF THE INVENTION

Controlling the flow of network traffic to and from devices residing on a data network is desirable for several reasons, including but not limited to preventing unauthorized network access and maintaining network security such as that of an enterprise local area network (LAN). Importantly, to control the flow of such network traffic, the identity of the devices on the network must be validated by those that access them or receive data from them. This can be accomplished by the installation of software known as agents on compatible network devices. The term "agents" as used herein refers to software programs that can be loaded onto a network device to validate the identity of the device onto which they are installed. This is commonly done in the context of enterprise mobility management (EMM) or bring your own device (BYOD) programs, where an enterprise administrator will install agents on network-enabled devices not owned by the enterprise to ensure identity validation is possible before allowing such devices to communicate with the network, although this practice may also be carried out on local devices owned by the enterprise to enable verification of device identities.

A shortcoming of this approach is that device identity attribution depends on an installed agent, but many network devices (basically all computing devices other than personal computers, e.g., peripherals such as printers and network cameras) lack the ability to have an agent installed. Without an agent, agentless methods must be employed that rely on either passive scanning of a target device to "fingerprint" its network posture or active communications used to probe various services after logging into the network. Another method is to initiate a connection to a target device's web server and read its associated data header information to gain detail about the target. The issue with all these methods is their ability to be spoofed or subjected to man-in-the-middle attacks, which is particularly problematic when the network device is, for example, a surveillance camera, and an attacker has blocked the camera feed to its connected monitor. Therefore, there is a need in the art for more universal, robust, and secure agentless methods for identity assurance of network devices.

BRIEF SUMMARY OF THE INVENTION

The invention of the present disclosure is that of an agentless identity-based method of authenticating, with non-repudiation, the identities of network-enabled devices and controlling the flow of network traffic to and from each device using that identity information. The invention leverages X.509 certificates associated with network devices and comprises at least one querying device in communication with at least network-enabled target device and optionally at least one intermediate device, such as but not limited to a switching device that can interface with a target device in the network and enable the at least one querying device to query the target device to obtain an X.509 certificate and associated certificate extensions and dictate switching actions, which may be carried out by the querying device according to instructions provided by a switching module residing on the querying device or located external to the querying device. As used herein, an X.509 certificate is defined as an X.509 including any extensions, such as but not limited to X.509 v3 extensions.

In certain embodiments, a querying device will obtain the X.509 certificate from a target device via Hypertext Transfer Protocol Secure (HTTPS) from the target device's web server or via any other method that allows the certificate to be exchanged. The X.509 certificate or its embedded information elements (as distinguished from the HTTPS header elements used in the query) can then be analyzed and the analytical output forwarded to a network switching module to allow, for example and not by way of limitation, validation of the identity of the target device, direction of network traffic to and from the target device, blocking of the target device's access to a network, permission for the target device to access the network, limiting of data traffic between the target device and the network, or otherwise switch traffic to and from the target device or intermediate network elements, as one of ordinary skill in the art will understand that there are additional actions a switching element can take on data traffic. The use of X.509 certificates leverages the International Telecommunication Union (ITU) and Internet Engineering Task Force (IETF) standards, which can provide attributable identity of a device as well as enable encryption. One of ordinary skill in the art will appreciate that while a state of the art web browser may validate the identity of a device and use a corresponding public key to set up encrypted communication, a web browser does not operate as a network switch. According to the present invention, however, network traffic may be switched according to the identity of a device, and in doing so may make use of private extensions within an X.509 certificate for added security or network configuration.

DETAILED DESCRIPTION OF THE INVENTION

The invention of the present disclosure is that of agentless identity-based switching systems and methods suitable for fixed application devices on a network such as, but no limited to, printers, cameras, card readers and other peripherals on which software or functionality cannot be installed independently of the manufacturer, although the invention may be used with other network devices on which software other than manufacturer-supplied firmware can be installed. As used herein, "fixed application device" means any device on which software cannot be installed other than manufacturer-provided firmware made available for the purpose of installing, updating or modifying the device's native operations, for example and not by way of limitation. In particular, target devices as described herein include devices on which agents cannot be installed to verify the identity of any such target device, as agentless identity verification is one object of the invention.

Figure 1:
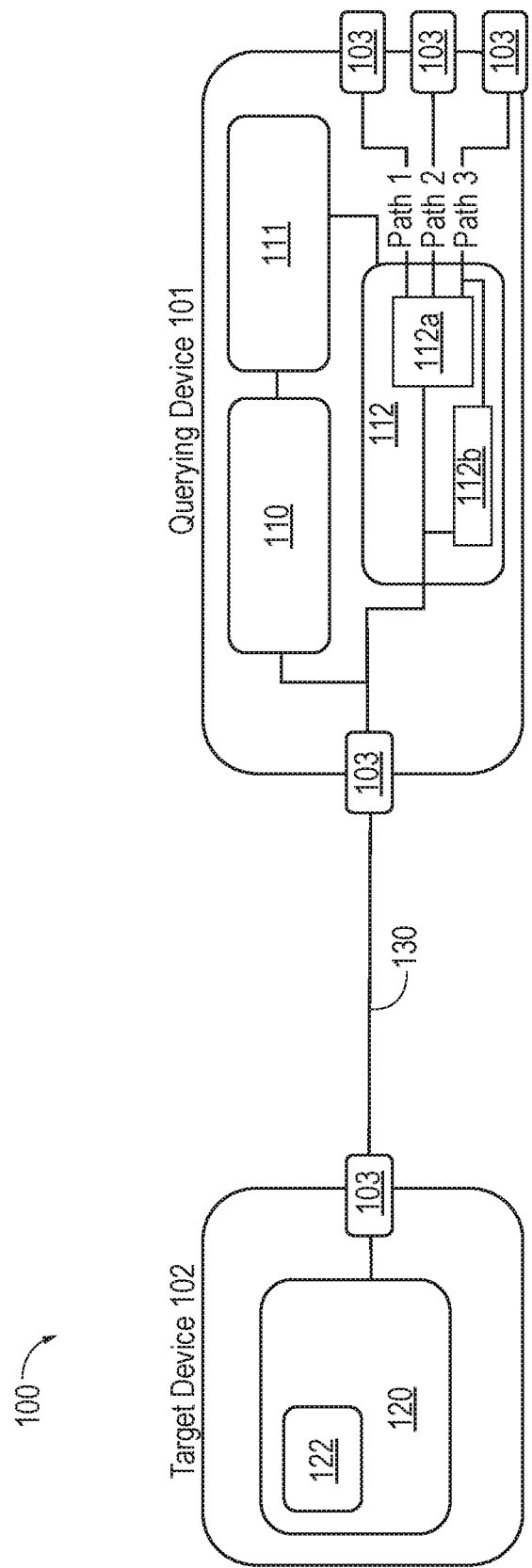
FIG. 1 diagrams an exemplary connectivity according to the present disclosure between a querying device and a target device in network communication with one another, wherein querying, identity validation and switching functions are inherent to the querying device.

FIG. 1 illustrates an exemplary system 100 of the present disclosure, comprising at least one querying device 101 and at least one target device 102 in network communication via one or more network interfaces 103 that allow the querying device 101 and target device 102 to connect over a network and establish a first data path 130 between the querying device 101 and target device 102. An exemplary system may further comprise one or more intermediate devices in network communication with the target device 102 and also in communication with a querying device 101.

Continuing with FIG. 1, a querying device 101 of an exemplary system 100 of the present disclosure may comprise at least one query module 110 tangibly stored on a non-transitory computer readable medium comprising instructions which when executed by a computer processor cause the processor to query a target device 102 HTTPS server 120, for example, by establishing a valid HTTPS session and capturing an X.509 certificate 122 of the target device 102. A querying device 101 may further comprise at least one analysis module 111 tangibly stored on a non-transitory computer readable medium comprising instructions which when executed by a computer processor cause the processor to parse the X.509 certificate 122 into individual information elements that can be used to attribute the correct identity of the target device 102. This eliminates the possibility, for example, that HTTPS header information of a target device 102 has been used to create a false attribution of the target device's identity away from the target device 102 and improves network security.

As illustrated in FIG. 1, a querying device 101 according to the present disclosure may also comprise at least one analysis module 111 tangibly stored on a non-transitory computer readable medium comprising instructions which when executed by a computer processor cause the processor to analyze the individual information elements of the X.509 certificate 122, provide comparative analysis against a supplied set of reference information elements to create an analytical output and pass the analytical output to a switching module 112. In certain embodiments, each of the information elements obtained from the X.509 certificate 122 is compared to the set of reference information elements supplied, resulting in, e.g., match, not match, or partial match, with or without a probability score). An analysis module 111 of the present invention may be optionally configured to verify the X.509 certificate 122 locally or via a public certificate authority or any other means to provide owner attribution and validation.

A querying device 101 of the present disclosure may further comprise at least one switching module 112 tangibly stored on a non-transitory computer readable medium comprising instructions which when executed by a computer processor will cause the processor to direct incoming data traffic from target device 102 based on the analytical output of the analysis module 111 according to a local switching action 112a or communicate an intermediate switching action 112b to an intermediate device 201 in network communication with the querying device and the target device 102.

Figure 2:
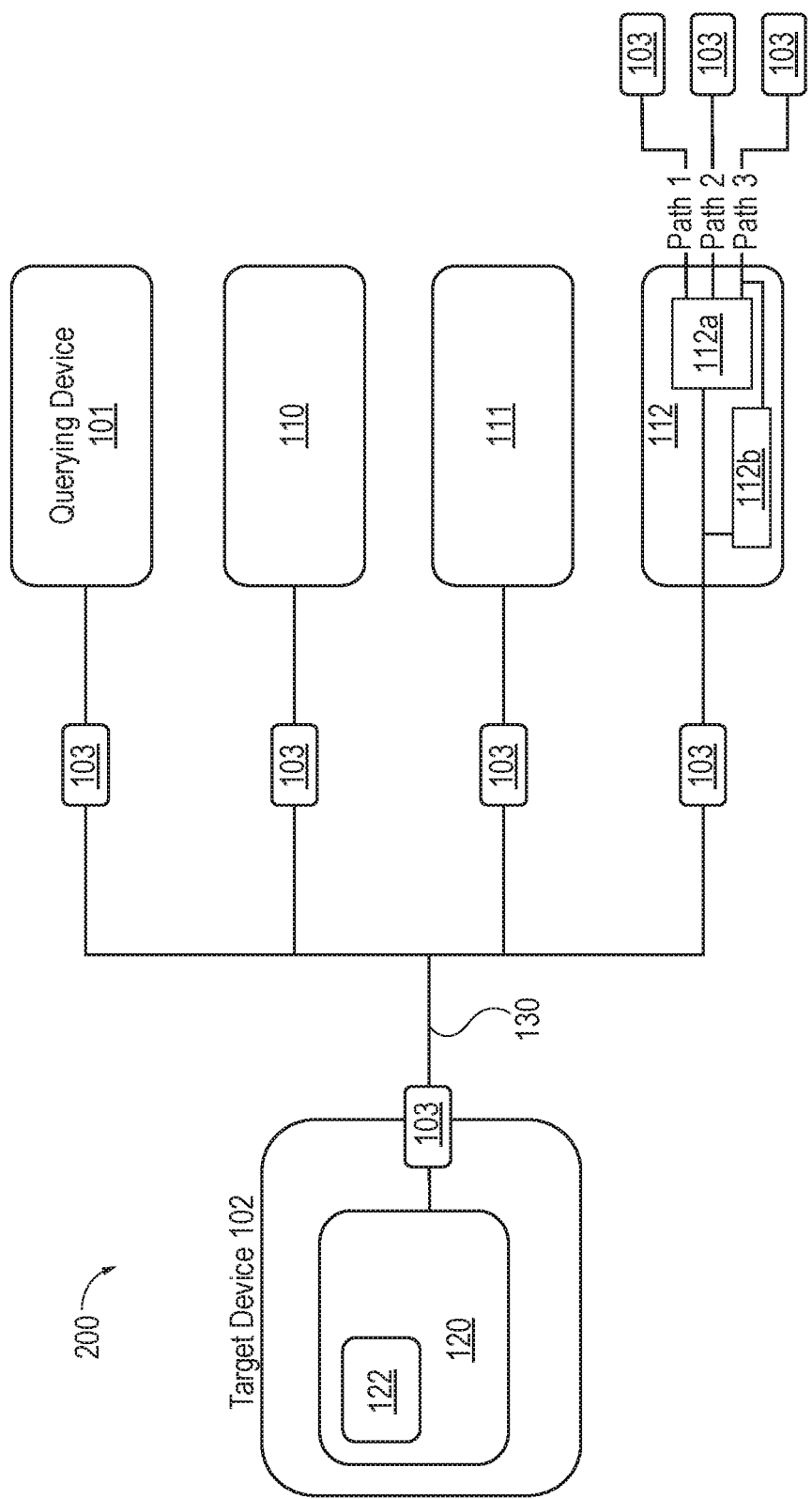
FIG. 2 diagrams an exemplary connectivity according to the present disclosure between a querying device and a target device in network communication with one another, wherein querying, identity validation and switching functions take place at different network locations.

Turning now to FIG. 2, an alternative embodiment 200 to the system illustrated in FIG. 1 may comprise the same functionality as the illustrative embodiment of FIG. 1, wherein the querying, analytical and switching functions reside in different locations as long as they remain in communication with one another. In the exemplary system 200, at least one querying device 101 and at least one target device 102 remain in network communication via one or more network interfaces 103 that allow the querying device 101 and target device 102 to connect to a network and establish a first data path 130 between the querying device 101 and target device 102. In contrast to the system illustrated in FIG. 1, query module 110 is not operating on the querying device 101, but rather comprises a separate network interface 103 capable of establishing a data path 130 with target device 102 HTTPS server 120 on behalf of querying device 101, for example, by establishing a valid HTTPS session and capturing an X.509 certificate 122 of the target device 102. Similarly, at least one analysis module 111 capable of parsing the X.509 certificate 122 into individual information elements that can be used to attribute the correct identity of the target device 102 may be in a different location than the querying device 101 and query module 110 while remaining in network communication with query module 110 to receive an X.509 certificate 122 for parsing and analysis. While the illustrative embodiments of FIG. 1 and FIG. 2 share functionalities, a system as described herein allows for flexibility in terms of where each system component is installed. One of ordinary skill in the art will appreciate that one or more of a query module 110, analysis module 111 and switching module 112 may be located internal or external to the querying device 101 depending on administrator preferences, while maintaining the desired functionality as previously described with regard to the system illustrated in FIG. 1 in each case.

Figure 3:
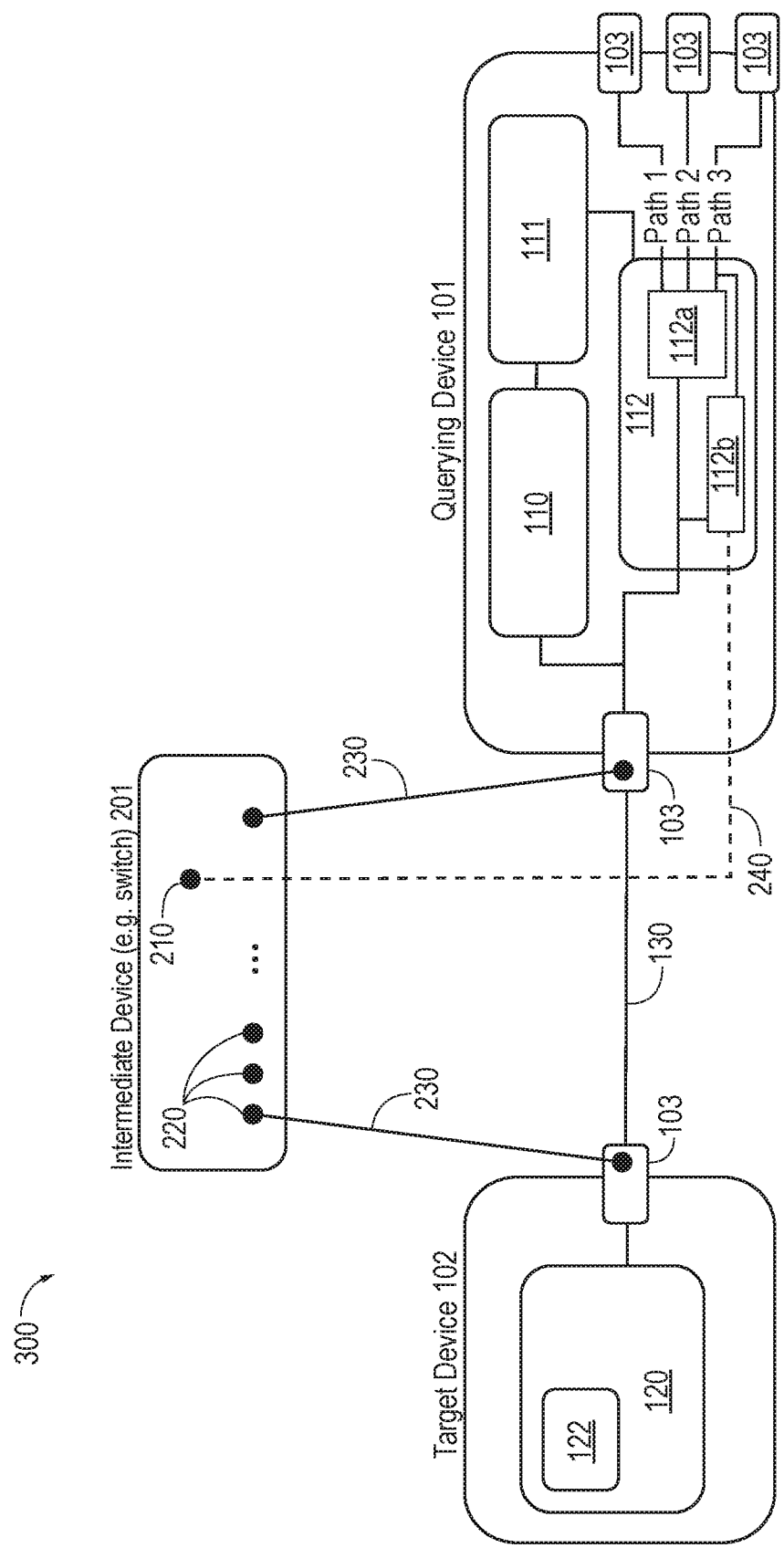
FIG. 3 diagrams an exemplary switching connectivity, where an intermediate device such as a network switch in communication with a target device may be signaled by a querying device to carry out switching functions once the target device identity has been established and validated by an analysis module, wherein querying, identity validation and switching functions are inherent to the querying device, but the desired switching behavior is carried out by an intermediate device between the querying device and the target device.

The illustrative embodiment of a system 300 as shown in FIG. 3 will allow one of ordinary skill in the art to appreciate additional flexibility offered by an agentless identity-based network switching system according to the invention of the present disclosure. The illustrative embodiment 300 comprises an intermediate device 201 such as but not limited to a network switch capable of executing an intermediate switching action 112b being communicated via logical signal 240 to management control interface 210 of the intermediate device 201. A second data path 230 is established between each of a querying device 101 and a target device 102 and the intermediate device 201 via network interfaces 103 and switch interfaces 220. Intermediate switching action 112b is communicated by switching module 112 after receiving analytical output of analysis module 111 following parsing and validation of incoming X.509 certificate data from target device 102 against a trusted source, which in certain embodiments may be a certificate authority, or alternatively may be accomplished internally.

Figure 4:
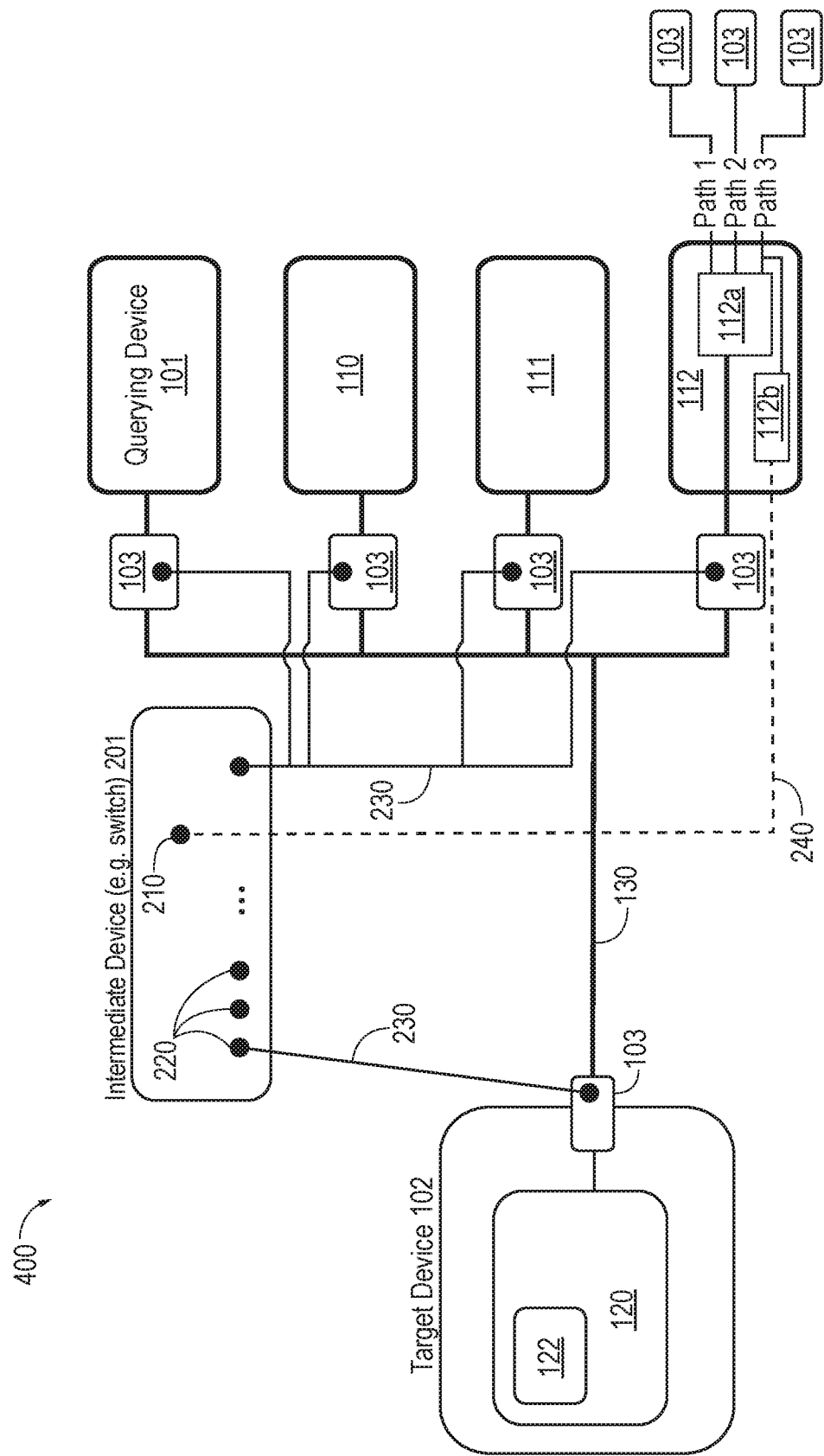
FIG. 4 diagrams an exemplary switching connectivity, where an intermediate device such as a network switch in communication with a target device may be signaled by a querying device to carry out switching functions once the target device identity has been established and validated by an analysis module, wherein querying, identity validation and switching functions take place at different network locations.

An alternative embodiment 400 to the system illustrated in FIG. 3 is illustrated in FIG. 4, wherein a query module 110, analysis module 111 and switching module 112 are not located within the querying device 101, although the same functionalities as those explained with regard to FIG. 3 are maintained. Again, one of ordinary skill in the art will recognize that a system as described herein may be location-independent with respect to where the various functional network components are located, with one or more of a query module 110, analysis module 111 and switching module 112 residing within querying device 101 or at another location in network communication with querying device 101.

Preferred embodiments of the invention of the present disclosure provide automatic and attributable identity of at least one network element (e.g., target device or system) without requiring the installation, configuration or modification of the underlying target device or system. Each network device according to the present disclosure may comprise an intrinsic web server within a communications path for identity-based network switching without an agent installed on the target device. The identity of the at least one network device is determined by parsing an X.509 into individual information elements and comparing the same against a reference set of information elements. In this way, the X.509 certificate may be transformed into an analytical output used by a network switch, as will be familiar to one of ordinary skill in the art, to determine what actions to take on incoming data and instruct the network switch to execute those action. Such actions may include, for example and not by way of limitation, by blocking, passing or diverting the data.

Network switching as described herein may executed locally within a querying device or by an intermediate device instructed to execute a switching action based on the analysis of individual X.509 certificate elements of a target device, including any extensions, performed by an analysis module 111 of the present disclosure. For example, and not by way of limitation, an analysis module 111 of the present invention may instruct a network element such as a router or firewall to route, forward, or block data traffic based on the outcome of X.509 certificate analysis.

Figure 5:
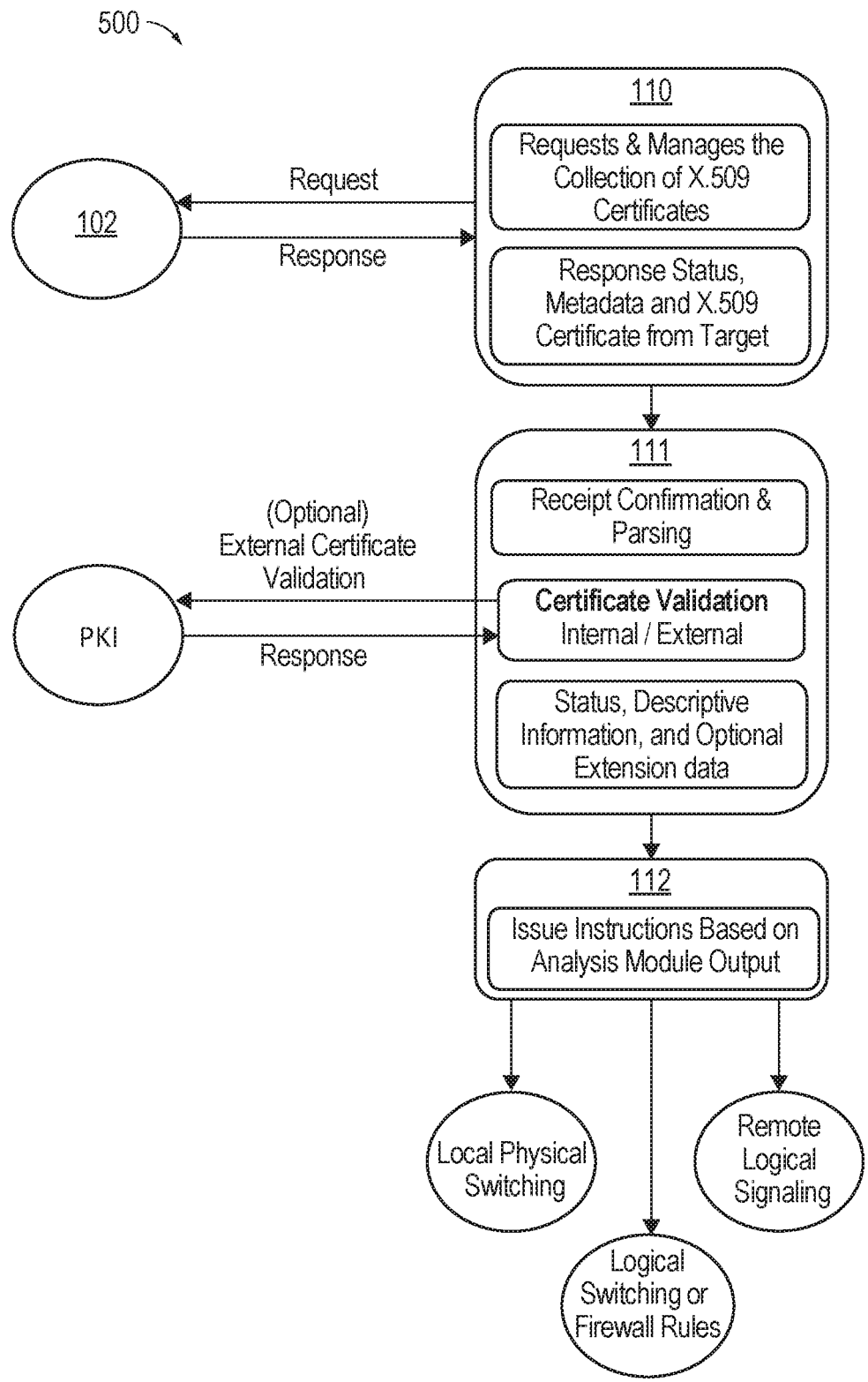
FIG. 5 illustrates data flows to and from a query module and analysis module according to the present invention and switching module actions taken based on analytical outputs of the analysis module.

FIG. 5 is provided to illustrate a method of agentless identity-based network switching according to the invention of the present disclosure by way of a process flow chart 500. A method according to the present invention is initialized by when a query module 110 of or external to a querying device 101 sends a request in the form of what one of ordinary skill in the art would be referred to as a "client hello" to an HTTPS server or equivalent of a target device 102, which prompts the target device 102 to automatically respond by sending its X.509 certificate to the query module 110. Query module 110 then causes a processor to collect the X.509 certificate of a target device 102 and hand it off to analysis module 111 for parsing via processor based on standardized fields as will be understood by one of ordinary skill in the art.

It is an object of the invention of the present disclosure to execute network communications flow management based on the individual information elements contained within a target device's X.509 certificate. HTTPS and X.509 certificates may be used to secure and verify communications between two endpoints end-to-end using Public Key Infrastructure (PKI) and public key cryptography methods. External PKI validation may be employed as illustrated in FIG. 5 by the analysis module 111, or alternatively analysis module 111 may comprise a means of internal validation. For example, in certain embodiments, one or more target devices 102 may be "enrolled" in a system of the present invention such that a query module 110 may query only those target devices enrolled, and each may comprise "private extensions" to each target device X.509 certificate that are recognizable to the corresponding analysis module 111 for internal certificate validation. Alternatively, a querying device of the present invention may scan a network to probe each device on the network for an HTTPS server, then obtain and analyze each device's X.509 certificate for the purpose of directing a switching activity based on the device's identity as described herein. Using any of these methods, the present invention fills a gap in the state of the art by requiring initiation of a valid HTTPS communication, wherein each target device X.509 certificate is received and parsed into individual X.509 certificate information elements, which then inform data switching decisions based on this analytical output which can be executed by network switches and the like.

As illustrated in FIG. 5, an analysis module 111 according to the present invention, after instructing the parsing an X.509 certificate, directs a switching module 112 as to which switching paradigms to follow with regard to network switching of target device traffic. For example, as illustrated in FIG. 5, local physical switching, remote logical signaling, or logical switching or firewall rules may dictate the desired switching behavior based on the analytical output of analysis module 112.

One of ordinary skill in the art will recognize that while establishing a valid HTTPS session is the most common methodology used in obtaining X.509 certificates from network-enabled devices, other methods may be employed in accordance with the present invention. For example, Simple Network Management Protocol (SNMP) may be employed as an alternative to the HTTPS standard, so a target device may receive an SNMP request and respond by automatically sending its X.509 certificate. The Lightweight Directory Access Protocol (LDAP) may be similarly employed as an alternative to HTTPS to carry out the methods described herein using Active Directory. In other embodiments, smart cards or security tokens such as Uniform Serial Bus (USB) tokens may be used to access a target device to obtain its X.509 certificate. The Bluetooth standard may also be leveraged where its physical proximity requirements are met between devices. Alternatively, an X.509 certificate may be transmitted as an export function in either binary form or in accordance with the American Standard Code for Information Interchange (ASCII). These and other alternatives will be appreciated by one of ordinary skill in the art.

While it is an object of the present invention to provide agentless identity-based network switching methods, it is possible that as an alternative, a client software or functionality may be installed on a target device for the purpose of responding to requests from a querying device for its X.509 certificate according to a method of the present disclosure. These and other objects of the present invention will be apparent to one of ordinary skill in the art, and alternatives in standards, protocols and specific methods to achieve the desired network switching behaviors will be understood by them. The embodiments described herein are included as examples of the agentless identity-based network switching systems and methods of the present invention, and do not represent limitations of the present invention.

The invention claimed is:

1. A system for agentless identity-based network switching of data traffic among network-enabled devices, the system comprising:
   a querying device in network communication with a target device, wherein the target device comprises an X.509 certificate identifying the target device; and
   a query module, an analysis module and a switching module, each tangibly stored on a non-transitory computer readable medium; wherein
   the query module comprises instructions which when executed by a processor cause the processor to establish a first data path between the querying device and the target device and obtain the X.509 certificate;
   the analysis module comprises instructions which when executed by a processor cause the processor to:
   parse the X.509 certificate into individual information elements;
   compare the individual information elements to a set of reference information elements;
   generate an analytical output comprising a validated identity of the target device based on comparison of the individual information elements to the reference information elements; and
   transmit the analytical output to the switching module; and
   the switching module comprises instructions which when executed by a processor cause the processor to execute a switching action on the data traffic received by the querying device from the target device over the first data path based on the analytical output;
   wherein the switching action is selected from the group consisting of blocking the target device's access to a network, permitting the target device's access to the network, limiting the target device's access to the network or diverting the target device's access away from the network, local physical switching, logical switching, application of firewall rules, remote logical signaling, and configuring the target device's access to the network.

2. The system of claim 1, wherein the switching action is executed from within the querying device.

3. The system of claim 1, wherein the target device is a fixed application device.

4. The system of claim 3, wherein the target device is selected from the group consisting of cameras, printers, access controllers, alarms, paging systems, locking systems, safe deposit boxes, cash management systems, automatic teller machines and card readers.

5. The system of claim 1, further comprising an intermediate device in network communication with the querying device, target device, query module, analysis module and switching module, the intermediate device comprising at least one switch interface and a management control interface, wherein:
   the query module further comprises instructions which when executed by a processor cause the processor to
   establish a second data path between the querying device and the target device through the intermediate device and obtain the X.509 certificate; and
   the switching module further comprises instructions which when executed by a processor cause the processor to:
   establish a logical interface between the switching module and the management control interface; and
   execute a switching action on the data traffic received by the querying device from the target device over the logical interface based on the analytical output;
   wherein the switching action is selected from the group consisting of blocking the target device's access to a network, permitting the target device's access to the network, limiting the target device's access to the network or diverting the target device's access away from the network, local physical switching, logical switching, application of firewall rules, remote logical signaling, and configuring the target device's access to the network.

6. The system of claim 5, wherein the switching action is executed from within the intermediate device.

7. The system of claim 5, wherein the target device is a fixed application device.

8. The system of claim 5, wherein the target device is selected from the group consisting of cameras, printers, access controllers, alarms, paging systems, locking systems, safe deposit boxes, cash management systems, automatic teller machines and card readers.

9. A method for agentless identity-based network switching of data traffic between network-enabled devices, the method comprising:
   initiating from a querying device a request for an X.509 certificate from a target device in network communication with the querying device;
   establishing via a processor a first data path between the querying device and the target device and requests and obtains the X.509 certificate in response to instructions communicated to the processor from a query module tangibly stored on a non-transitory computer readable medium;
   parsing the X.509 certificate in response to instructions communicated to the processor from an analysis module tangibly stored on a non-transitory computer readable medium into individual information elements and compares the individual information elements to a set of reference information elements to generate an analytical output comprising a validated identity of the target device based on comparison of the individual information elements to the reference information elements;
   transmitting the analytical output to a switching module tangibly stored on a non-transitory computer readable medium; and
   executing a switching action in response to instructions communicated to the processor from the switching module on data traffic received by the querying device from the target device over the first data path based on the analytical output;
   wherein the switching action is selected from the group consisting of blocking the target device's access to a network, permitting the target device's access to the network, limiting the target device's access to the network or diverting the target device's access away from the network, local physical switching, logical switching, application of firewall rules, remote logical signaling, and configuring the target device's access to the network.

10. The method of claim 9, wherein the reference set of information elements is selected from Public Key Infrastructure (PKI) elements or a reference set of information elements intrinsic to the analysis module.

11. The method of claim 9, wherein the target device is a fixed application device.

12. The method of claim 9, wherein the target device is selected from the group consisting of cameras, printers, access controllers, alarms, paging systems, locking systems, safe deposit boxes, cash management systems, automatic teller machines and card readers.

13. The method of claim 9, the method further comprising:
- establishing via a processor a second data path between the querying device and the target device through an intermediate device in response to instructions communicated from the query module;
- transmitting the analytical output to a switching module tangibly stored on a non-transitory computer readable medium;
- establishing a logical interface between the switching module and a management control interface of the intermediate device; and
- executing via the intermediate device the switching action in response to instructions communicated to the processor from the switching module on data traffic received by the querying device from the target device over the second data path based on the analytical output;
- wherein the switching action is selected from the group consisting of blocking the target device's access to a network, permitting the target device's access to the network, limiting the target device's access to the network or diverting the target device's access away from the network, local physical switching, logical switching, application of firewall rules, remote logical signaling, and configuring the target device's access to the network.

14. The method of claim 9, wherein the reference set of information elements is selected from Public Key Infrastructure (PKI) elements or a reference set of information elements intrinsic to the analysis module.

15. The method of claim 9, wherein the target device is a fixed application device.

16. The method of claim 9, wherein the target device is selected from the group consisting of cameras, printers, access controllers, alarms, paging systems, locking systems, safe deposit boxes, cash management systems, automatic teller machines and card readers.

* * * * *